US008689322B2

(12) United States Patent
Park

(10) Patent No.: US 8,689,322 B2
(45) Date of Patent: Apr. 1, 2014

(54) AUTHENTICATION METHOD FOR INFORMATION APPARATUS

(75) Inventor: Jin-Mo Park, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 1404 days.

(21) Appl. No.: 11/775,510

(22) Filed: Jul. 10, 2007

(65) Prior Publication Data
US 2008/0022394 A1 Jan. 24, 2008

(30) Foreign Application Priority Data

Jul. 11, 2006 (KR) .................. 10-2006-0064780

(51) Int. Cl.
*H04L 29/00* (2006.01)
(52) U.S. Cl.
USPC .......................................... 726/18; 713/185
(58) Field of Classification Search
USPC .......................................... 726/18; 713/185
See application file for complete search history.

(56) References Cited

U.S. PATENT DOCUMENTS

| 6,070,246 A * | 5/2000 | Beser ................... 726/2 |
| 6,128,742 A * | 10/2000 | Felt ..................... 726/5 |
| 2003/0188171 A1* | 10/2003 | DeCenzo et al. ........ 713/185 |
| 2005/0216942 A1* | 9/2005 | Barton ................. 725/97 |

FOREIGN PATENT DOCUMENTS

| JP | 2005-033778 A | 2/2005 |
| KR | 1020060012179 A | 2/2006 |
| KR | 1020060047396 A | 5/2006 |
| WO | WO-02/073877 A2 | 9/2002 |

* cited by examiner

*Primary Examiner* — Brandon Hoffman
*Assistant Examiner* — Michael D Anderson
(74) *Attorney, Agent, or Firm* — Birch, Stewart, Kolasch & Birch, LLP

(57) ABSTRACT

Disclosed herein is an authentication method for an information apparatus. The method includes receiving a first password, generated based on the system time of the information apparatus, from an external device connected to the information apparatus, generating a second password based on the time at which the first password was received, and determining whether the firs and second passwords coincide with each other.

14 Claims, 3 Drawing Sheets

AUTHENTICATION METHOD FOR INFORMATION APPARATUS

BACKGROUND OF THE INVENTION

1. Field of the Invention

The present invention relates generally to an authentication method for an information apparatus and, more particularly, to a method of initializing an authentication key, such as a password, through an authentication process in a Digital Video Recorder (DVR) that records surveillance video.

2. Description of the Related Art

Recently, with the wide commercialization of Digital Video Recorders (DVRs), surveillance cameras are installed in places requiring security, capture subjects while zooming in or out on the subjects, and can store the video data of the captured surveillance video in the DVRs.

Such a surveillance camera captures a subject in a corresponding area and outputs the surveillance video of the subject to a DVR at a remote location, and the DVR not only displays the surveillance video, captured by the surveillance camera, on a monitor but also records the surveillance video in a storage medium, such as a hard disk or an optical disk, included in the DVR.

In the DVR, when starting the operation of the system, initializing the system, or inspecting the surveillance video recorded in the storage medium, an authentication key is requested from a user by displaying a screen capable of receiving the authentication key, such as a password, on the monitor, so that unauthorized persons, rather than an administrator, are prevented from accessing the system and the system and data recorded in the system are protected. Furthermore, the administrator may change the authentication key so as to prevent unauthorized persons from using the DVR without permission.

Meanwhile, when the administrator periodically or sporadically changes the authentication key so as to prevent leakage of the authentication key, the case where the authentication key is lost occasionally occurs. When the authentication key is lost, it is impossible to start the system, play back video recorded in the DVR, or control a specific camera.

In the conventional DVR 100, when the administrator loses the authentication key, the administrator solves the problem by resetting the authentication key set in the system using the general password or universal authentication key, provided by a DVR developer, for initializing the authentication key, as shown in FIG. 1.

However, the provided general password may be leaked, either intentionally or unintentionally, so that the problem of initializing or attacking authentication keys, not only in the same set but also in other systems, without permission using the general password or universal authentication key may occur.

SUMMARY OF THE INVENTION

Accordingly, the present invention has been made keeping in mind the above problems occurring in the prior art, and an object of the present invention is to provide an efficient authentication method for initializing an authentication key.

In order to accomplish the above object, the present invention provides an authentication method for an information apparatus, including receiving a first password, generated based on the system time of the information apparatus, from an external device connected to the information apparatus; generating a second password based on the time at which the first password was received; and determining whether the first and second passwords coincide with each other.

In an embodiment of the present invention, the authentication method may further include, if the two passwords coincide with each other, initializing the information apparatus.

In an embodiment of the present invention, the unique information of the information apparatus is additionally used when the first and second passwords are generated.

In an embodiment of the present invention, the unique information may be any one of a MAC address or a product serial number of the information apparatus.

In an embodiment of the present invention, the external device may be connected to the information apparatus via a USB connection or an IEEE 1394 connection.

In an embodiment of the present invention, time information except for seconds is used when the first and second passwords are generated.

In an embodiment of the present invention, the first and second passwords are generated using a Message Digest 5 (MD5) password generation algorithm.

In an embodiment of the present invention, the information apparatus is any one of a DVR, a data recording device, a set-top box.

In addition, the present invention provides an authentication system, comprising

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF PREFERRED EMBODIMENTS

Preferred embodiments of an authentication method according to the present invention will be described in detail with reference to the accompanying drawings below.

Figure 1:
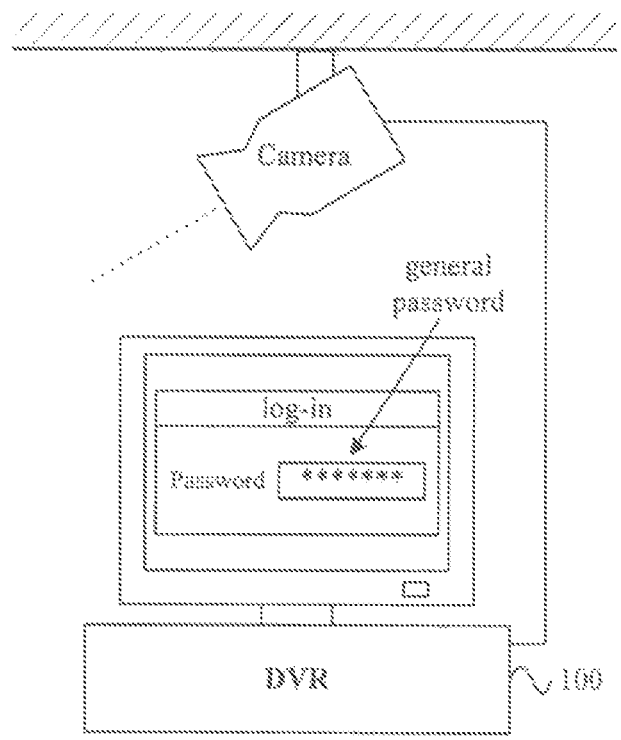
FIG. 1 is a diagram showing a method of initializing an authentication key in a conventional DVR when the authentication key is lost.
Figure 2:
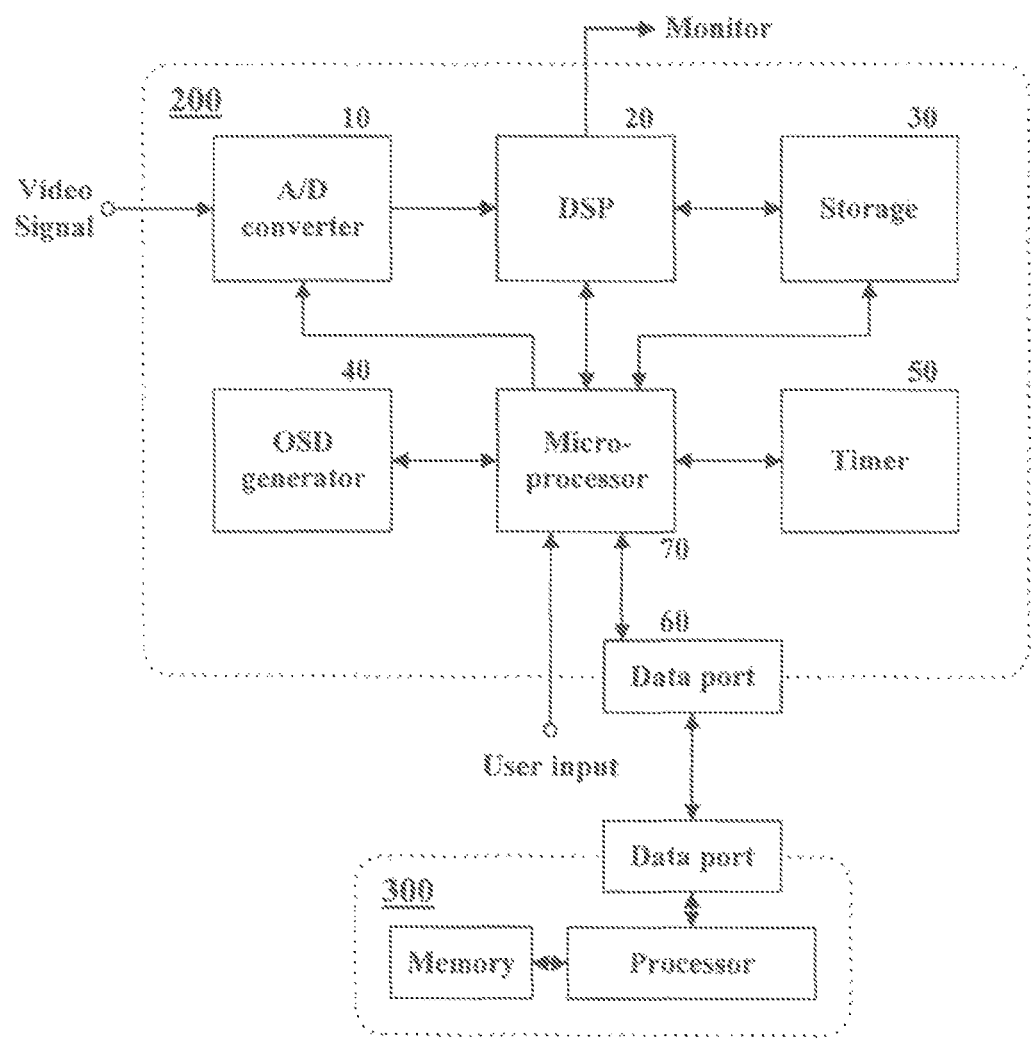
FIG. 2 is a diagram showing the construction of a DVR and an external device to which the present invention for initializing an authentication key through authentication is applied.

A system to which the authentication method according to the present invention is applied, as shown in FIG. 2, may include a DVR 200 and an external device 300 which exchanges data with the DVR 200 through communication with the DVR 200 via Universal Serial Bus (USB), Institute of Electrical and Electronics Engineers (IEEE) 1394 or similar standard data ports.

The DVR 200 to which the present invention is applied stores the data of surveillance video, sent from a surveillance camera, in a storage medium, plays back surveillance video in the storage medium, or performs an authentication operation of initializing the authentication key through communication with the external device 300 connecting via data ports when the authentication key for system operation is lost.

The DVR 200 may include an Analog-to-Digital (A/D) converter 10, a Digital Signal Processor (DSP) 20, storage 30, an On-Screen Display (OSD) generator 40, a timer 50, a data port 60, and a microprocessor 70.

The A/D converter 10 converts analog video signals, sent from the Charge Coupled Device (CCD) of a surveillance camera, into digital video data. The DSP 20 converts the digital data of surveillance video into video frames and outputs the video frames to an external display device, such as a monitor, encodes the digital video data and records the digital video data in the storage 30, and decodes the video data recorded in the storage 30 and plays back the video data. Furthermore, the storage 30 stores data encoded by the DSP 20, and a high-capacity recording medium, such as a hard disk or an optical disk, may be used as the storage 30.

The OSD generator 40 generates a screen that includes information related to the operation of the DVR 200, and a screen that can receive an authentication key, such as a password, from a user. The timer 50 maintains system time. The data port 60 functions as a data path from and to the external device 300 connected therethrough according to a standard such as USB.

The microprocessor 70 controls the respective components so as to operate the DVR 200. In particular, when the authentication key for the operation of the system is lost and thus the authentication operation of initializing the authentication key is performed, the microprocessor 70 determines whether a first password, which the external device 300 connected to the data port 60 generates based on the time information of the DVR 200, coincides with a second password, which is generated based on the time at which the first password is received.

The microprocessor 70 sends the time information of the DVR 200 to the external device 300 at the request of the external device 300, generates the second password, based on the time at which the first password generated by the external device 300 is received, or the time at which the first password is input by a user, and initializes the authentication key for the operation of the system if the two passwords coincide with each other, thereby allowing an administrator to input a new authentication key.

That is, when a password necessary for authentication for the initialization of the authentication key is generated, the generated password is allowed to work within a specific valid time period, so that authentication using the password does not succeed in the same system or in other systems after the specific valid time period has elapsed, and thus the initialization of an authentication key is prevented from being performed, thereby maintaining security.

The external device 300 to which the present invention is applied generates a password necessary for authentication that is performed at the time of initializing the authentication key set in a system, that is, the DVR 200, in which case the external device 300 generates the password necessary for authentication based on the time information sent from the DVR 200, and resends the generated password to the DVR 200.

Meanwhile, the unique number of the DVR 200 may be used along with the time information of the DVR 200 to generate the first and second passwords. Here, the unique number may be the Media Access Control (MAC) address or product serial number of the DVR 200.

For this purpose, the external device 300 may include a data port functioning as a path for exchanging data with the DVR 200, memory for storing a program for generating a password, the time information and the unique number, sent from the DVR 200 via the data port, and the generated password, and a processor for generating the password by executing the program and communicating with the DVR 200 via the data port.

The microprocessor 70 of the DVR 200 and the processor of the external device 300 generate the first password and the second password using time information and, optionally, a unique number, such as a MAC address. For example, a Message Digest 5 (MD5) algorithm may be used to generate the first and second passwords.

Meanwhile, there may be a significant difference between the respective times required to generate the first and second passwords for the initialization of the authentication key, in which case the two generated passwords may vary from each other. In order to prevent this problem, a password generation algorithm for generating the first and second passwords can use only day, hours, and minutes, but not seconds.

The external device 300 may be provided along with the DVR 200 by a manufacturer, so that it can be used to perform authentication for the initialization of the authentication key when the password of the system is lost. Furthermore, the program that is executed in the external device 300 and generates the first password may be provided via a storage medium, such as an optical disk or a memory stick, or a network by a manufacturer at the request of the administrator of the DVR 200. Such programs may be distinguished from each other according to version, distribution date and time, or the like.

The program may be designed such that it can be executed by the processor of the external device 300 one time after being stored in the memory of the external device 300. In this case, the program is not executed if time information and, optionally, product information have been stored in the memory.

Furthermore, in order to prevent the program provided by the manufacturer from being reused and leaking, the processor of the external device 300 may check whether a program having the same version and the same distribution time has been already stored in the memory of the external device 300, and prevent the same program from being copied to the memory again.

In contrast, if a program having a different version and a different distribution time has been stored in the memory, the processor of the external device 300 deletes the time information, the unique number and the program stored in the memory, stores a new program in the memory, and executes the new program.

The processor requests the unique number and the time information from the DVR 200 system in compliance with the executed program, stores the time information and the unique number, sent through the data port, in the memory, generates a first password based on the time information and the unique number using a password generation algorithm, such as MD5, and sends the first password to the DVR 200.

Figure 3:
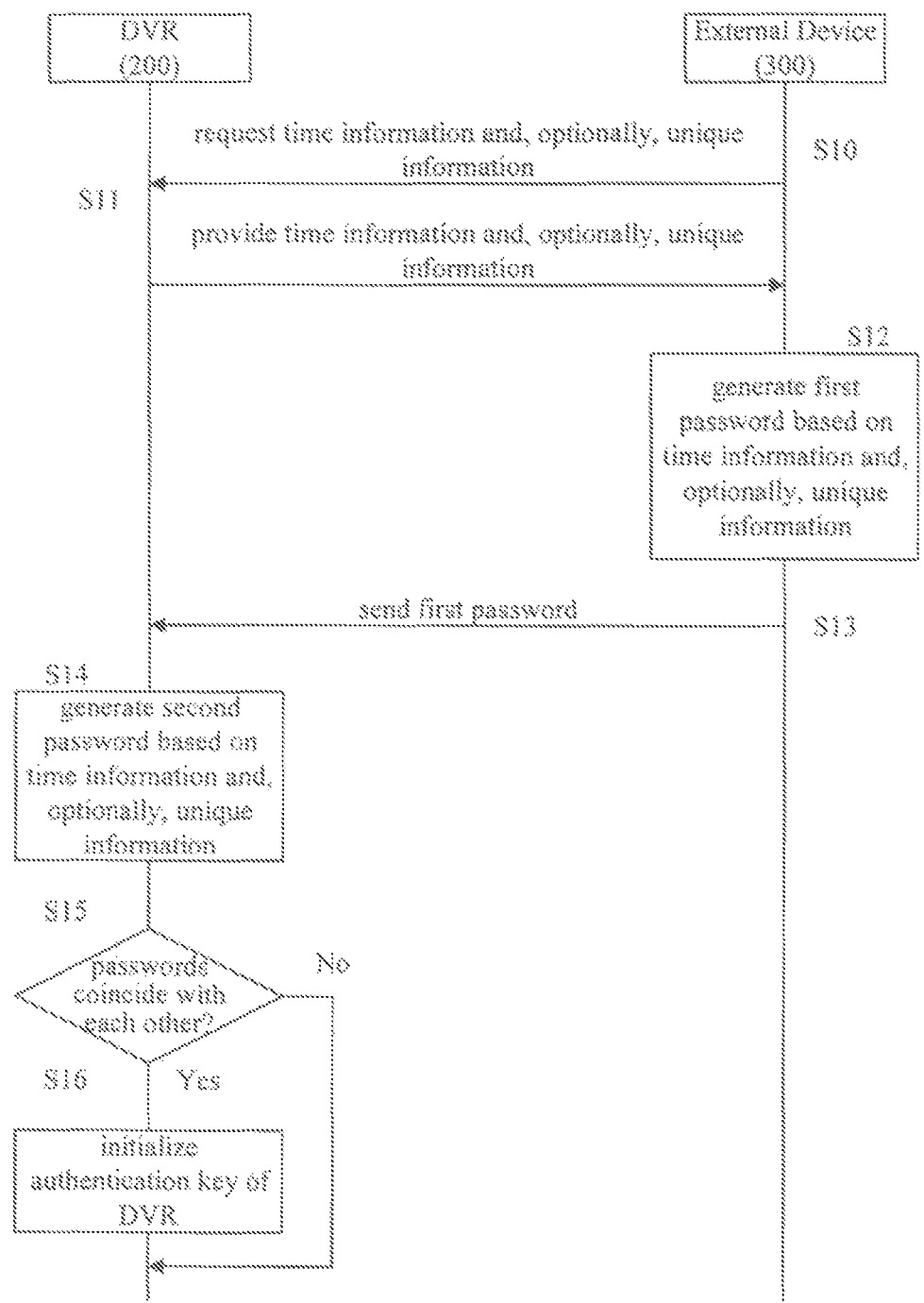
FIG. 3 is a diagram showing a process of initializing the authentication key of a system through authentication according to an embodiment of the present invention.

FIG. 3 is a diagram showing a process of initializing the authentication key of a system through authentication according to an embodiment of the present invention.

An administrator, having lost the authentication key of the DVR 200, is provided with a program for initializing the authentication key by the manufacturer of the DVR 200, and sends the program to the external device 300 via the data port 60 of the DVR 200.

The processor of the external device 300 stores the sent program in the memory, executes the program, and requests time information and, optionally, a unique number from the DVR 200, connected via the data port, in compliance with the executed program at step S10.

Accordingly, the microprocessor 70 of the DVR 200 sends the time information and, optionally, the unique product number to the external device 300 via the data port 60 at step S11. The time information is the time at which the external device 300 requests the time information and the unique number, and is a system time maintained by the timer 50. The unique number is optional information, and may be an MAC address or a product serial number.

The processor of the external device 300, having received the time information and, optionally, the unique number, stores the information in the memory, and generates a first password using a password generation algorithm, such as MD5, based on the information at step S12, and sends the password to the DVR 200 at step S13.

The microprocessor 70, having received the first password, generates a second password using an algorithm identical to the algorithm used for the generation of the first password, based on the time information and, optionally, the unique product number at step S14. Here, the time information is the time at which the DVR 200 receives the first password from the external device 300.

As described above, the algorithm for generating the first and second passwords uses only day, hours, and minutes, but not seconds, so that there can be prevented the occurrence of the case were there is a difference in the time that is the basis for the generation of the first and second passwords and the passwords become different.

The microprocessor 70 checks whether the first and second passwords coincide with each other at step S15, and, if the passwords coincide with each other, initializes the authentication key set in the DVR 200 and controls the OSD generator 40 so that a new password can be input at step S16. Alternatively, if the two passwords coincide with each other, the initialization of the DVR 200 system may be performed.

If the first password and the second password do not coincide with each other, the microprocessor 70 generates a screen including an error message by controlling the OSD generator 40, outputs the screen to the monitor, and rejects the initialization of the authentication key.

The present invention can be applied to a data recording device, such as a Digital Versatile Disk (DVD) recorder, a set-top box, and other devices requiring security, as well as the DVR.

As a result, according to the present invention, the authentication key of a system can be safely initialized through an authentication process without the leakage of a general password or universal authentication key.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An authentication method of an information apparatus, comprising:
  receiving, by the information apparatus, a first password from an external device connected to the information apparatus,
  wherein the first password is generated by the external device using a first system time received from the information apparatus;
  generating, by the information apparatus, a second password using a second system time of the information apparatus when the first password was received; and
  determining, by the information apparatus, whether the first and second passwords coincide with each other,
  wherein the first and second system times used to generate the first and second passwords are in a format comprising a day, an hour and a minute.

2. The authentication method as set forth in claim 1, further comprising:
  if the two passwords coincide with each other, initializing the information apparatus.

3. The authentication method as set forth in claim 1, wherein unique information of the information apparatus is additionally used when the first and second passwords are generated.

4. The authentication method as set forth in claim 3, wherein the unique information is any one of a Media Access Control (MAC) address or a product serial number of the information apparatus.

5. The authentication method as set forth in claim 1, wherein the external device is connected to the information apparatus via a Universal Serial Bus (USB) connection or an Institute of Electrical and Electronics Engineers (IEEE) 1394 connection.

6. The authentication method as set forth in claim 1, wherein the first and second passwords are generated using a Message Digest 5 (MD5) password generation algorithm.

7. The authentication method as set forth in claim 1, wherein the information apparatus is any one of a Digital Video Recorder (DVR), a data recording device, and a set-top box.

8. An authentication system, comprising:
  a first apparatus configured to
    generate a first password using a first system time received from a second apparatus and
    transmit the first password to the second apparatus; and
  the second apparatus configured to
    receive the first password from the first apparatus,
    generate a second password using a second system time of the second apparatus when the first password was received,
    determine whether the first and second passwords coincide with each other, and
    initialize itself if the two passwords coincide with each other,
  wherein the first and second system times used to generate the first and second passwords are in a format comprising a day, an hour and a minute.

9. The authentication system as set forth in claim 8, wherein unique information of the second apparatus is additionally used when the first and second passwords are generated.

10. The authentication system as set forth in claim 9, wherein the unique information is any one of a Media Access Control (MAC) address or a product serial number of the second apparatus.

11. The authentication system as set forth in claim 8, wherein the first apparatus is connected to the second apparatus via a Universal Serial Bus (USB) connection or an Institute of Electrical and Electronics Engineers (IEEE) 1394 connection.

12. The authentication system as set forth in claim 8, wherein the first and second passwords are generated using a Message Digest 5 (MD5) password generation algorithm.

13. The authentication system as set forth in claim 8, wherein the second apparatus is any one of a Digital Video Recorder (DVR), a data recording device, and a set-top box.

14. An information apparatus configured to:
  receive a first password from an external device connected to the information apparatus,
  wherein the first password is generated by the external device using a first system time of the information apparatus, generate a second password using a second system time of the information apparatus when the first password was received, and determine whether the first and second passwords coincide with each other, wherein the first and second system times used to generate the first and second passwords are in a format comprising a day, an hour and a minute.

* * * * *